United States Patent
Ali et al.

(10) Patent No.: US 11,885,683 B2
(45) Date of Patent: Jan. 30, 2024

(54) METHOD FOR ESTIMATING CHLOROPHYLL CONTENT OF A LEAF

(71) Applicant: YARA INTERNATIONAL ASA, Oslo (NO)

(72) Inventors: Idaly Ali, Singapore (SG); Matthew Lim, Singapore (SG); Robin Yeo, Singapore (SG); Zhide Loh, Singapore (SG); Muhammad Izuddin, Singapore (SG); Navin Twarakavi, Whitefield (IN)

(73) Assignee: YARA INTERNATIONAL ASA, Oslo (NO)

( * ) Notice: Subject to any disclaimer, the term of this patent is extended or adjusted under 35 U.S.C. 154(b) by 345 days.

(21) Appl. No.: 17/442,232

(22) PCT Filed: May 28, 2020

(86) PCT No.: PCT/EP2020/064784
§ 371 (c)(1),
(2) Date: Sep. 23, 2021

(87) PCT Pub. No.: WO2020/239880
PCT Pub. Date: Dec. 3, 2020

(65) Prior Publication Data
US 2022/0155146 A1    May 19, 2022

(30) Foreign Application Priority Data
May 29, 2019  (EP) ..................................... 19177155

(51) Int. Cl.
*G01J 3/42*    (2006.01)
*G06T 7/90*    (2017.01)
(Continued)

(52) U.S. Cl.
CPC ............... *G01J 3/42* (2013.01); *G01J 3/0272* (2013.01); *G01J 3/10* (2013.01); *G01N 21/84* (2013.01);
(Continued)

(58) Field of Classification Search
CPC .... G01J 3/42; G01J 3/0272; G01J 3/10; G01J 3/28; G01J 3/2803; G01N 21/84;
(Continued)

(56) References Cited

U.S. PATENT DOCUMENTS

2018/0003686 A1*  1/2018  Ozcan ................ G01N 33/0098

FOREIGN PATENT DOCUMENTS

WO    2019081729 A1    5/2019

OTHER PUBLICATIONS

Gaviria-Palacio, Daniel et al, "Fast estimation of chlorophyll content on plant leaves using the light sensor of a smartphone", DYNA, (Oct. 1, 2017), vol. 84, No. 203, doi:10.15446/dyna.v84n203.64316, ISSN 0012-7353, pp. 233-239, XP055641410.
(Continued)

*Primary Examiner* — Charlotte M Baker
(74) *Attorney, Agent, or Firm* — Dilworth IP, LLC

(57) ABSTRACT

A method of estimating chlorophyll content of a leaf including providing a device wherein the device includes a mobile computing device with a digital camera; and a peripheral removably attached to the mobile computing device, the peripheral including a light source aligned with the digital camera, wherein the peripheral provides for a space between the light source and the digital camera; capturing by the digital camera a first image of the light source turned on without the leaf interposed between the digital camera and the light source; retrieving exposure data of the first image; capturing by the digital camera a second image with the leaf interposed between the digital camera and the turned on
(Continued)

light source; retrieving exposure data of the second image; and using a processor, estimating the chlorophyll content of the leaf based on the retrieved exposure data of the first and second images.

13 Claims, 5 Drawing Sheets

(51) Int. Cl.
*G01J 3/02* (2006.01)
*G01J 3/10* (2006.01)
*G01N 21/84* (2006.01)

(52) U.S. Cl.
CPC ........ *G06T 7/90* (2017.01); *G01N 2021/8466* (2013.01); *G06T 2207/30188* (2013.01)

(58) Field of Classification Search
CPC .. G01N 2021/8466; G01N 21/25; G06T 7/90; G06T 2207/30188
USPC .......................................... 382/110
See application file for complete search history.

(56) References Cited

OTHER PUBLICATIONS

Vesali, F et al, "Feasibility of using smart phones to estimate chlorophyll content in corn plants", Photosynthetica, Kluwer, Dordrecht, NL, vol. 55, No. 4, doi:10.1007/S11099-016-0677-9, ISSN 0300-3604, (Nov. 30, 2016), pp. 603-610, (Nov. 30, 2016), XP036310990.
Vesali, Farshad et al, "Development of an android app to estimate chlorophyll content of corn leaves based on contact imaging", Computers and Electronics in Agriculture, Amsterdam, NL, (Aug. 1, 2015), vol. 116, doi:10.1016/j.compag.2015.06.012, ISSN 0168-1699, pp. 211-220, XP055424589.
Hiscocks, Peter D. et al, "Measuring Luminance with a Digital Camera: Case History", (Nov. 25, 2013), URL: http://www.ee.ryerson.ca/~phiscock/astronomy/light-pollution/luminance-case-history.pdf, XP055310224.
International Search Report and Written Opinion in related PCT/EP2020/064784, dated Jul. 10, 2020, 15 pages.
International Preliminary Report on Patentability in related PCT/EP2020/064784, dated May 11, 2021, 20 pages.

* cited by examiner

US 11,885,683 B2

METHOD FOR ESTIMATING CHLOROPHYLL CONTENT OF A LEAF

TECHNICAL FIELD

The present invention relates to a method of estimating chlorophyll content of a leaf, a computer program product, a computer-readable storage medium, an electrical signal, and a mobile computing device.

BACKGROUND

The chlorophyll content of plant leaves is related to the nutritional status of the plant. Hence by measuring the chlorophyll content one can determine if the plant needs further fertilizer.

The SPAD-502Plus by Konica Minolta is a portable measuring device for chlorophyll content of leaves. SPAD-502Plus determines the relative amount of chlorophyll present by measuring the absorbance of the leaf in two wavelength regions using two LED (light emitting diode) elements and one silicone photodiode. However, this dedicated device is relatively expensive and may hence not be available for everyone.

Furthermore, WO2019081729 discloses a handheld device (e.g. a smartphone or tablet) for determining a status of a plant comprising: a multi pixel digital colour sensor; a light source (e.g. the flash light of the smartphone) arranged for providing broadband illumination, wherein the light source and the multi pixel digital colour sensor are arranged in substantially the same plane; a light guide for guiding the light from said light source into the direction of the multi pixel digital colour sensor; a sample space, provided between the multi pixel digital colour sensor and the light source, for insertion of at least a part of the plant therein; and a processing unit arranged for controlling at least the multi pixel digital colour sensor and the light source. The light guide may be detachably attached to the smartphone or tablet. The processing unit may be arranged for controlling the multi pixel digital colour sensor and the light source for obtaining a first image of the plant part with the light source switched on, and obtaining a second image of the plant part with the light source switched off, wherein the multi pixel digital colour sensor is arranged for obtaining at least a red (R), green (G) and blue (B) colour component, together forming a set of colour components, and wherein the processing unit is arranged for performing at least the following operations: (i) determining a first colour value representative of a difference in intensity values in the first and the second image for a first of the colour components; (ii) determining a second colour value representative of a difference in intensity values in the first and the second image for a second of the colour components; (iii) calculating a value representative of a status of the plant using the first colour value and the second colour value. While the device in WO2019081729 may reduce the cost since it can use an existing smartphone or tablet, there is still room for improvement with respect to versatility and usage of processing power.

Furthermore, Versali et al. "Feasibility of using smart phones to estimate chlorophyll content in corn plants" Photosynthetica, December 2017, Volume 55, Issue 4, pp 603-610 discloses a smartphone and a light holder with an LED (light emitting diode) attached to the smartphone, wherein images were captured of leaves on top of the LED in light-aided spectral absorption photometry. In the light-aided spectral absorption photometry, all settings of the smartphone camera including ISO, exposure time etc. were kept constant. R, G and B components as well as various indices were extracted from the acquired images. However, a drawback with the solution in Versali et al. is that it may require quite a bit of processing power.

SUMMARY OF THE INVENTION

It is an object of the present invention to overcome or at least alleviate the aforementioned problems.

According to a first aspect of the present invention, this and other objects is achieved by a method of estimating chlorophyll content of a leaf, which method comprises: providing a device, wherein the device comprises: a mobile computing device comprising a digital camera; and a peripheral removably attached to the mobile computing device, the peripheral comprising a light source aligned with the digital camera when the peripheral is removably attached to the mobile computing device such that the light source may illuminate a lens of the digital camera, wherein the peripheral provides for a space between the light source and the digital camera such that the leaf may be interposed between the digital camera and the light source; capturing by the digital camera a first image of the light source turned on without the leaf interposed between the digital camera and the light source; retrieving exposure data of the first image; capturing by the digital camera a second image with the leaf interposed between the digital camera and the turned on light source; retrieving exposure data of the second image; and using a processor, estimating the chlorophyll content of the leaf based on the retrieved exposure data of the first and second images, wherein the exposure data include at least one of exposure time, F-number, and ISO value. That is, the processor may estimate the chlorophyll content of the leaf based on at least one of exposure time, F-number, and ISO value of the first and second images. The processor may be included in the aforementioned mobile computing device. The method may be (at least partly) computer-implemented.

The peripheral may also be referred to as an accessory for the mobile computing device. The peripheral could for example comprise a U-shaped clamp clamping the peripheral to the mobile computing device, and a holder holding the light source in front of the digital camera such that the light source may illuminate a lens of the digital camera. Furthermore, the first and second images captured by the digital camera could be recorded images or live images. In the latter case, the retrieved exposure data may be real-time readings from the digital camera's sensor. Furthermore, the first and second images may be automatically captured by the digital camera while the mobile computing device instructs a user to insert/remove the leaf.

The present invention is based on the understanding that exposure data, preferably Exif data, of first and second images without and with the leaf conveniently can be used to estimate the chlorophyll content of the leaf. That is, depending on the chlorophyll content, the leaf will absorb more or less of the light emitted by the light source, which typically results e.g. in longer exposure time and/or smaller F-number (wider aperture) for the second image compared to the first image, as indicated by the exposure data. By means of the present invention, the processing power needed to estimate the chlorophyll content of the leaf is greatly reduced compared to more advanced image analysis techniques. Hence, also a less powerful and typically less expensive mobile computing device could be used, such as low-end smartphones. Furthermore, the device (method) is highly precise relative to cost. Furthermore, since the light source is external of the mobile computing device and no light guide is used, the peripheral removably attached or attachable to the mobile computing device and comprising the light source can be designed to fit most mobile computing devices comprising a digital camera, making the present device (method) very versatile.

The exposure data may be Exif (Exchangeable image file format) data. Exif is a standard that specifies the formats for images used devices handling image files recorded by digital cameras. Exif data is convenient to use in the present invention because it is readily available in many mobile computing devices comprising a digital camera.

As mentioned, the exposure data may include at least one of exposure time, F-number, and ISO value. Exposure time is the length of time when the sensor of the digital camera is exposed to light, F-number is the ratio of the focal length to the aperture in the digital camera, and ISO value is "film speed".

The mobile computing device may control the digital camera such that the first and second images are captured with the same exposure time and ISO value, and estimate the chlorophyll content of the leaf based on any change in F-number of the first and second images. For example, the exposure time and ISO value may be set to 1/125s and ISO 100, respectively, for both images, whereas the F-number may decrease from say 5.6 to 4 (digital camera in shutter priority mode), wherein the decrease is indicative of the chlorophyll content of the leaf. Typically, the more chlorophyll the greater aperture opening needed (smaller F-number). In another embodiment, the mobile computing device may control the digital camera such that the first and second images are captured with the same F-number and ISO value, and estimate the chlorophyll content of the leaf based on any change in exposure time of the first and second images (digital camera in aperture priority mode). In any case, by keeping the exposure time and ISO value constant or the F-number and ISO value constant, the digital camera only needs to figure out a single parameter (F-number or exposure time), which may provide for fast estimation of the chlorophyll content of the leaf.

In yet another embodiment, the mobile computing device may control the digital camera such that the first and second images are captured with the same value of at least one of exposure time, F-number, and ISO value. That is, only one of the three parameters/values may here be kept constant. Preferably F-number is kept constant, since ISO value is easier to control, i.e. more dynamic than F-number.

Estimating (by the mobile computing device) the chlorophyll content of the leaf based on the retrieved exposure data of the first and second images may comprise determining illuminance values of the first and second images based on the retrieved exposure data of the first and second images and determining an attenuation value based on the determined illuminance values. The illuminance value (lux) may be defined as lux=$C*(N*N)/(S*t)$, where C is a constant that depends on the digital camera, N is the F-number, S is the ISO value, and t is the exposure time. As described above, S and t may be the same for both images, whereas N may vary. The illuminance value may alternatively be defined as lux=$C*(2^{EV})/S$, where EV is the exposure value. The exposure value may be included in the aforementioned exposure data. The attenuation value is defined as ($lux_{with\ leaf}$)/($lux_{without\ leaf}$). An advantage of using the attenuation value is that it is unitless and independent of the aforementioned constant C.

Estimating (by the mobile computing device) the chlorophyll content of the leaf may further be based on a predefined thickness of the leaf, which predefined thickness of the leaf is based on type of crop and day of sowing from a user input to the mobile computing device. The user may for example enter type of crop (e.g. wheat, rice, corn, etc.) and days after sowing (e.g. 10 or 15 days) or crop stage week via a user interface (e.g. a touchscreen) of the mobile computing device, whereby the mobile computing device may (be configured to) retrieve the thickness of the leaf from a table that shows mean thickness of leaves at different stages of growth. Alternatively, the user could measure the actual thickness of the leaf and input it to the mobile computing device.

The method may further comprise computing (by the mobile computing device) a (proprietary) value indicative of the chlorophyll content of the leaf based on the determined attenuation value and the predefined thickness of the leaf. The proprietary value can for example be an N-Tester value. The N-Tester value may be computed as N-Tester value=weight1*ln(attenuation value)+weight2*predefined leaf thickness, where ln is the natural logarithm function. Early trials of the present device show a strong correlation between the results derived using this equation and Yara's N-Tester (0.769-0.811). Computation of the present N-Tester value using the attenuation value requires only a single equation. Furthermore, the inventors have found a linear relationship between N-Tester value and the natural logarithm of the attenuation value, which means that the N-Tester value can be computed significantly faster and with less processing power than more advanced image analysis techniques. The weights weight1 and weight2 for a particular digital camera can be calculated using four calibration papers of known thickness, N-Tester value, and attenuation.

The mobile computing device may automatically set a focus point of the digital camera on the turned on light source (and if possible focus on the turned on light source) for capturing the first image and control the digital camera so as to use the same focus point when capturing the second image (that is, the first and second images may be captured with the same focus point). This typically means that also the digital camera's light metering is "focused" on the turned on light source. The turned on light source is typically the brightest spot in the scene. Using the same focus point may speed up the process as the digital camera does not need to adjust to the introduction of the leaf. Further, this allows the estimation to be independent from the exact position of the leaf between the digital camera and the light source.

The light source may be adapted to emit light at least partly absorbable by chlorophyll pigments, chlorophyll a and chlorophyll b.

The light source may be adapted to emit light of a single predetermined wavelength, for example 650 nm or in the range of 640-649 nm or in the range of 651-670 nm. 650 nm is useful because both chlorophyll a and chlorophyll b have high absorption of light at this wavelength.

The light source is preferably an LED (light emitting diode).

The light source may be provided with a hollow light guide, for example a cylinder, for blocking ambient light when the light source is aligned with the digital camera. This may improve the chlorophyll content estimation.

The mobile computing device may be a smartphone or tablet.

Throughout the document, the image taken without the leaf interposed between the light source and the camera is referred to as the first image, and the image taken with the leaf interposed between the light source and the camera is referred to as the second image. However, this does not imply that the image without the leaf has to be taken before the image with the leaf. It may be possible to first, place the leaf between the light source and the camera, capture a picture of the turned on light source with the leaf interposed between the light source and the camera, remove the leaf and capture another picture of the light source without the leaf interposed.

According to a second aspect of the present invention, there is provided a computer program product comprising computer program code to perform, when executed on a mobile computing device, the steps of: capturing by a digital camera of the mobile computing device a first image of a turned on light source of a peripheral removably attached to the mobile computing device, which first image is captured without a leaf interposed between the digital camera and the light source; retrieving exposure data of the first image; capturing by the digital camera a second image with the leaf interposed between the digital camera and the turned on light source; retrieving exposure data of the second image; and estimating the chlorophyll content of the leaf based on the retrieved exposure data of the first and second images, wherein the exposure data include at least one of exposure time, F-number, and ISO value. The computer program product may be a non-transitory computer program product. The computer program product may be an app (for a smartphone or tablet). This aspect may exhibit the same or similar features and technical effects as the first aspect, and vice versa.

According to a third aspect of the present invention, there is provided a computer-readable storage medium comprising the computer program product according to the second aspect.

According to a fourth aspect of the present invention, there is provided an electrical signal embodied on a carrier wave and propagated on an electrical medium, the electrical signal comprising the computer program product according to the second aspect.

According to a fifth aspect of the present invention, there is provided a mobile computing device comprising the computer-readable storage medium according to the third aspect.

According to a sixth aspect of the present invention, there is provided a device for estimating chlorophyll content of a leaf, which device comprises: a mobile computing device comprising a digital camera; and a peripheral removably attached or attachable to the mobile computing device, the peripheral comprising a light source aligned with the digital camera when the peripheral is removably attached to the mobile computing device, wherein the mobile computing device is configured to retrieve exposure data of a first image of the light source turned on, which first image is captured by the digital camera without the leaf interposed between the digital camera and the light source, retrieve exposure data of a second image captured by the digital camera with the leaf interposed between the digital camera and the turned on light source, and estimate the chlorophyll content of the leaf based on the retrieved exposure data of the first and second images. This aspect may exhibit the same or similar features and technical effects as any one of the other aspects, and vice versa.

BRIEF DESCRIPTION OF THE DRAWINGS

These and other aspects of the present invention will now be described in more detail, with reference to the appended drawings showing a currently preferred embodiment of the invention.

DETAILED DESCRIPTION

Figure 1A:
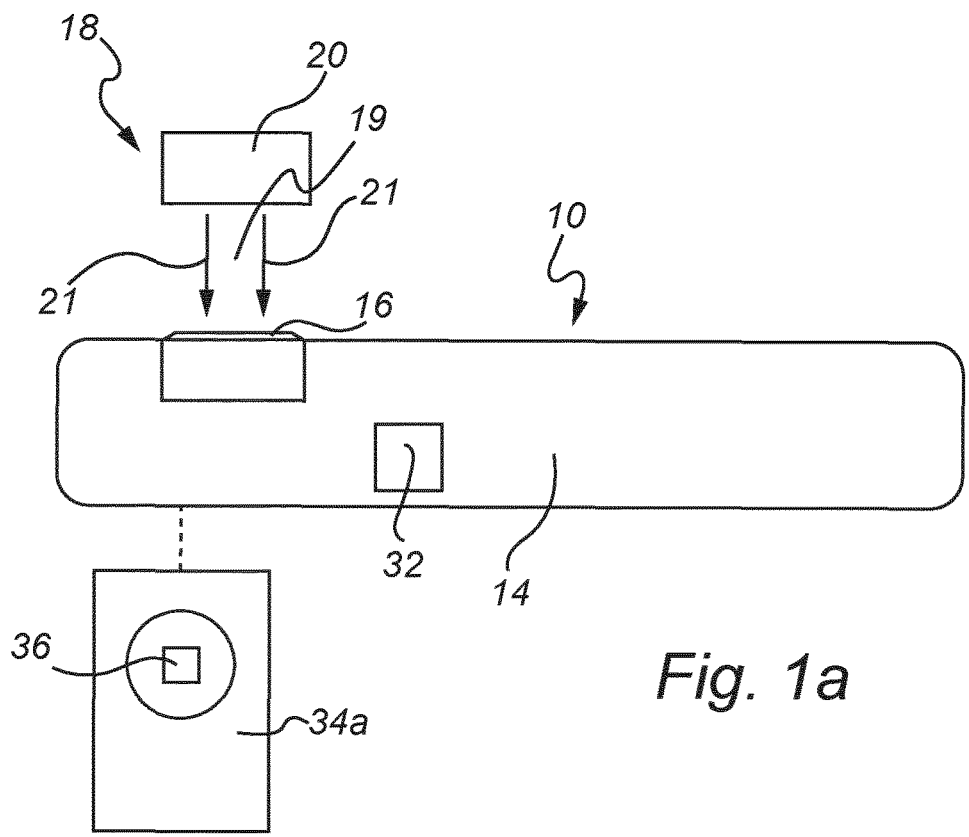
FIGS. 1a-b are schematic side views of a device according to an embodiment of the present invention.
Figure 1B:
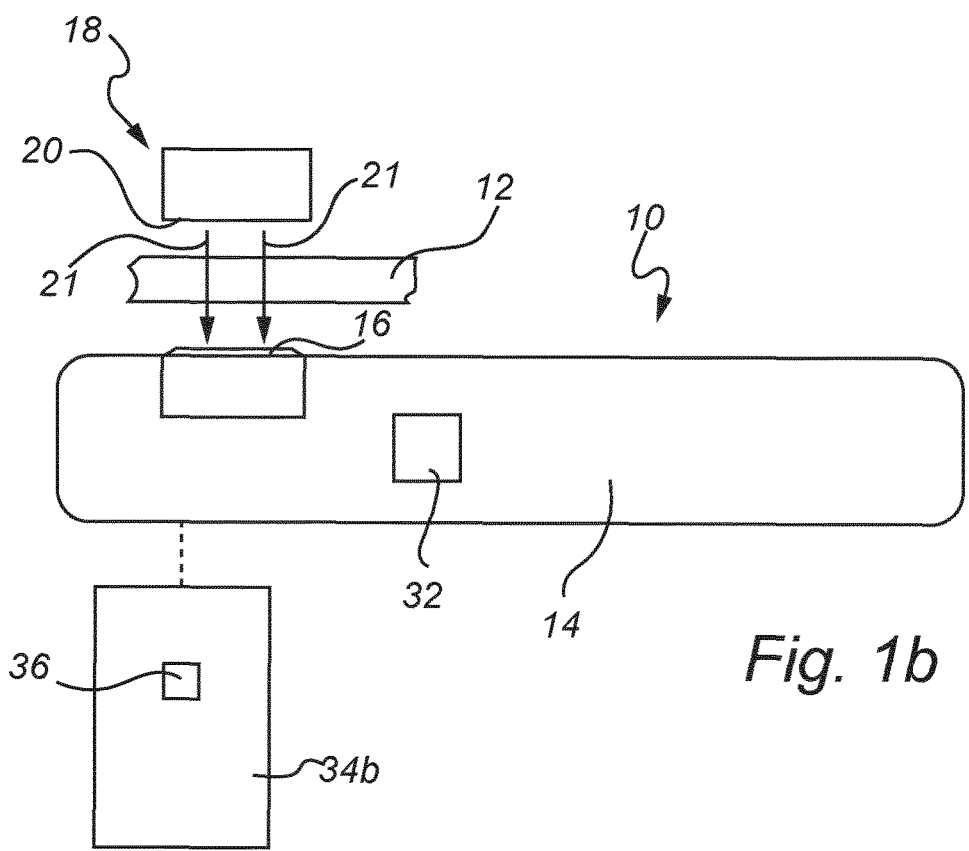

FIGS. 1a-b are schematic side views of a device 10 for estimating chlorophyll content of a leaf 12 according to an embodiment of the present invention.

The device 10 comprises a mobile computing device 14. The mobile computing device 14 may be handheld. The mobile computing device 14 may for example be a smartphone (e.g. an iPhone or an Android phone) or a tablet (e.g. an iPad).

The mobile computing device 14 comprises a digital camera 16 as detailed further below. Furthermore, the mobile computing device 14 may comprise a processor, a memory, a storage, and a user interface. The user interface may comprise a touchscreen.

The digital camera 16 may for example be arranged at the back of the mobile computing device 14. The digital camera 16 may include a sensor, a lens, light meter functionality (for exposure control), and autofocus functionality. The digital camera 16 may be configured to provide exposure data, namely Exif data, of images captured by the digital camera 16. The captured images could be recorded images (e.g. stored on the aforementioned storage) and/or live images (i.e. real-time sensor readings). The Exif data may include exposure time, F-number (aperture), and ISO value.

The device 10 further comprises a peripheral 18. The peripheral 18 may also be referred to as an accessory for the mobile computing device 14. The peripheral 18 is removably attached or removably attachable to the mobile computing device 14, and comprises a light source 20 aligned with the digital camera 14 when the peripheral 18 is removably attached to the mobile computing device 14. As illustrated, the peripheral 18 provides for a space 19 between the light source 20 and the digital camera 16. The light source 20 is adapted to emit light 21 of a single predetermined wavelength, here 650 nm, i.e. visible red light. The light source 20 is preferably at least one LED (light emitting diode). The peripheral 18 may also comprise a battery electrically connected to the light source 20 and adapted to power the light source 20. The peripheral 18 may also comprise a switch allowing a user to turn on/off the light source 20. As such, the peripheral 18 may be self-contained and only mechanically connected to the mobile computing device 14.

Figure 2A:
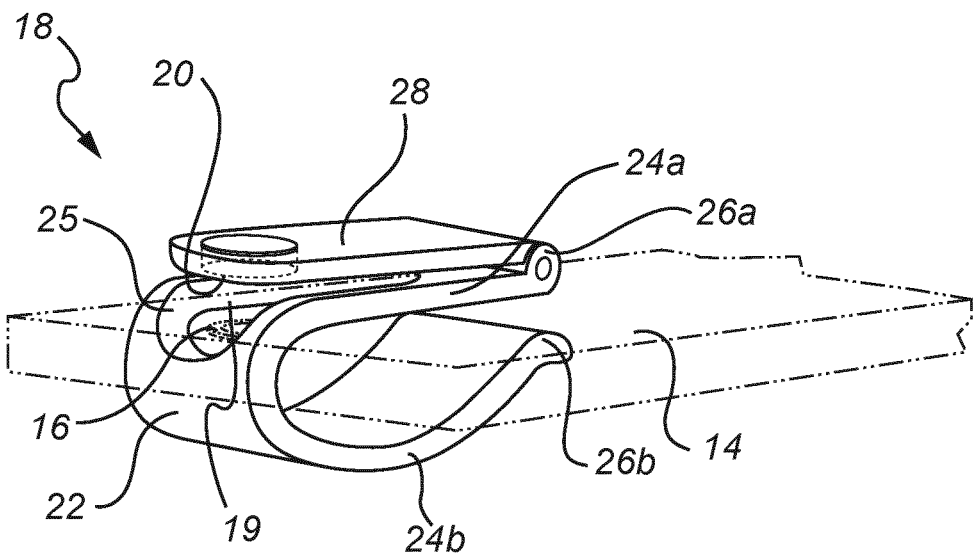
FIGS. 2a-b are perspective views of a peripheral of the device of FIGS. 1a-b according to an embodiment.
Figure 2B:
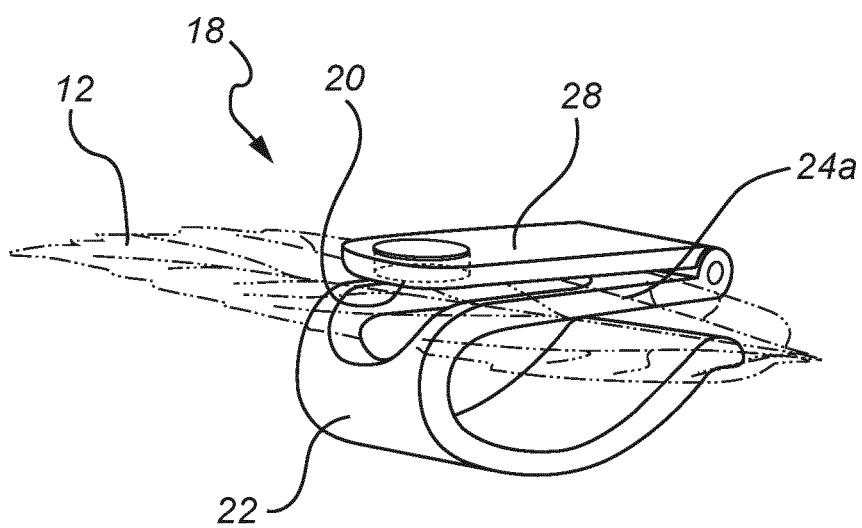

With further reference to FIGS. 2a-b, the peripheral 18 can comprise a U-shaped clamp 22 clamping the peripheral 18 to the mobile computing device 14. The clamp 22 comprises a first leg 24a abutting the back of the mobile computing device 14, and a curved second leg 24b with a distal end portion 26b abutting the front of the mobile computing device 14. The clamp 22 can be somewhat flexible in order to fit mobile computing devices with different depths. The clamp 22 can for example be made of plastic. The first leg 24a comprises an opening 25 which exposes the lens of the digital camera 16. The opening 25 may also function as a lens hood for the digital camera 16.

The peripheral 18 further comprises a holder 28 connected at the distal end portion 26a of the first leg 24a and holding the light source 20 in front of the digital camera 16. The holder 28 may be arranged over the first leg 24a. The holder 28 holds the light source 20 and aligns it with the digital camera 16 such that the light source 20 may illuminate the lens of the digital camera 16 and such that the light source 20 is within the field of view of the digital camera 16. The leaf 12 may be placed between the holder 28 and the first leg 24a such that the leaf 12 is interposed (placed) between the digital camera 16 and the light source 20. Furthermore, the holder 28 may be pivotally connected to the first leg 24a so that it temporarily can be lifted up to facilitate placement of the leaf 12.

Figure 3A:
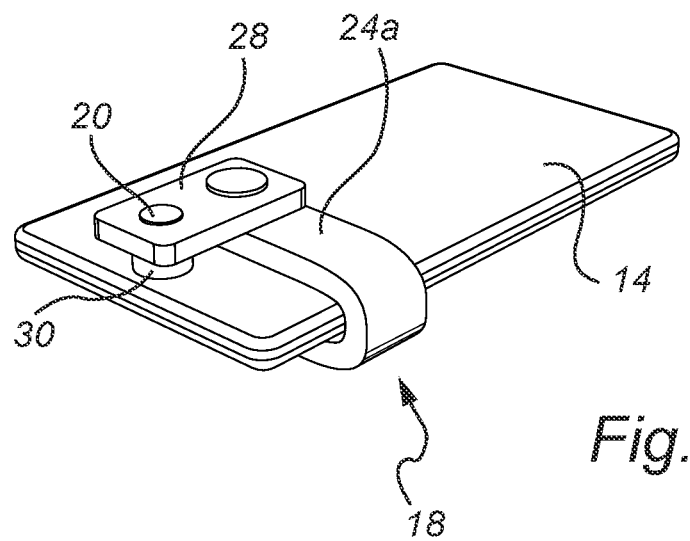
FIGS. 3a-b are perspective views of a peripheral of the device of FIGS. 1a-b according to another embodiment.
Figure 3B:
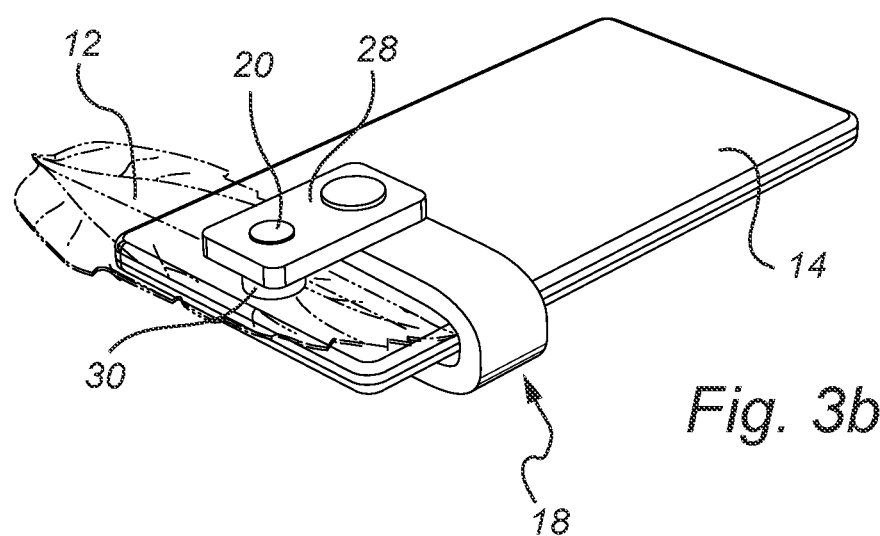

In another embodiment of the peripheral shown in FIG. 3a-b, the holder 28 is arranged substantially perpendicular to the first leg 24a, which first leg 24a here does not need to have an opening 25. Furthermore, the light source 20 may be provided with a "lens hood" in the form of a (right circular hollow) cylinder 30 for blocking ambient light.

Moving on, the mobile computing device 14 may be configured to perform various specific steps or actions detailed in the following by means of an app 32 (computer program product). The app 32 may be downloaded to the mobile computing device 14 and stored on the aforementioned storage of the mobile computing device 14. The app 32 may run or be executed on the mobile computing device 14 using the aforementioned processor and memory of the mobile computing device 14.

Specifically, the mobile computing device 14 is configured to retrieve exposure data of a first image 34a of the light source 20 turned on, which first image 34a is captured by the digital camera 16 without the leaf 12 interposed between the digital camera 16 and the light source 20 (FIGS. 1a, 2a, and 3a). The retrieved exposure data may include exposure time, F-number (aperture), and ISO value, for example 1/1000s, 2.8, and ISO 100.

The first image 34a may be automatically captured by the digital camera 16 while the mobile computing device 14 instructs the user to remove any leaf 12 placed between the digital camera 16 and the light source 20. To this end, an appropriate message ("remove leaf") may for example be displayed on the aforementioned touchscreen of the mobile computing device 14.

Furthermore, the mobile computing device 14 may be configured to automatically set a focus point 36 of the digital camera 16 on the centre of the turned on light source 20 for capturing the first image 34a. This may include: performing Gaussian low pass filtering, RGB to HSV (hue, saturation, value) conversion, red band pass filtering, extracting contours using Suzuki's border following, extracting bounding box with smaller area, and finding center of bounding box. Setting the focus point 36 on the turned on light source 20 may also "focus" the light metering of the digital camera 16 on the turned on light source 20.

The mobile computing device 14 is further configured to retrieve exposure data of a second image 34b captured by the digital camera 16 with the leaf 12 interposed between the digital camera 16 and the turned on light source 20 still aligned with the digital camera 16 (FIGS. 1b, 2b, and 3b), as will be discussed in further detail below.

The second image may be automatically captured by the digital camera 16 while the mobile computing device 14 instructs the user to place the leaf 12 between the digital camera 16 and the light source 20. Furthermore, the mobile computing device 14 may be configured to control the digital camera 16 so as to use the same focus point 36 when capturing the second image 34b, and such that the first and second images 34a-b are captured with at least the same ISO value, e.g. ISO 100, whereas the exposure time and F-number are selected by the digital camera 16 using the light meter functionality to get correct exposure (digital camera 16 in program mode). The selected exposure time and F-number may for example be 1/60s and 1.3. Hence, the retrieve exposure data of the second image 34b may for example include 1/60s, 1.3, and ISO 100. Here it is noted that the exposure time has increased from 1/1000s to 1/60s, and the F-number has changed from 2.8 to 1.3 (i.e. a wider aperture was used for the second image 34b).

The mobile computing device 14 is further configured to estimate the chlorophyll content of the leaf 12 based on the retrieved exposure data of the first and second images 34a-b.

Specifically, the mobile computing device 14 may be configured to determine illuminance values of the first and second images 34a-b based on the retrieved exposure data of the first and second images 34a-b, and to determine an attenuation value based on the determined illuminance values. The illuminance value (lux) may be defined as $lux=C*(N*N)/(S*t)$, where C is a constant that depends on the digital camera, N is the F-number, S is the ISO value, and t is the exposure time. With the exemplary exposure data presented above, $lux_{without\ leaf}=78.39*C$ (first image) and $lux_{with\ leaf}=1.014*C$ (second image). The attenuation value is defined as $(lux_{with\ leaf})/(lux_{without\ leaf})$. With the exemplary exposure data presented above, the attenuation value is 0.0129. Notably, the attenuation value is independent of C.

The mobile computing device 14 may further be configured to compute an N-Tester value based on the determined attenuation value and a predefined thickness of the leaf 12, wherein the N-Tester value is indicative of the chlorophyll content. The predefined thickness of the leaf 12 may be based on type of crop and day of sowing as inputted by the user to the mobile computing device 14. The user may for example enter type of crop (e.g. wheat, rice, corn, etc.) and days after sowing (e.g. 90 or 105 days) or crop stage week via the aforementioned touchscreen of the mobile computing device 14. 'Wheat' and crop stage week 4 could for example yield a leaf thickness of 0.2886 mm.

The N-Tester value may be computed as N-Tester value=weight1*ln(attenuation value)+weight2*predefined leaf thickness, wherein the weights weight1 and weight2 for a particular digital camera 14 can be calculated using four calibration papers of known thickness, N-Tester value, and attenuation value.

Figure 4:
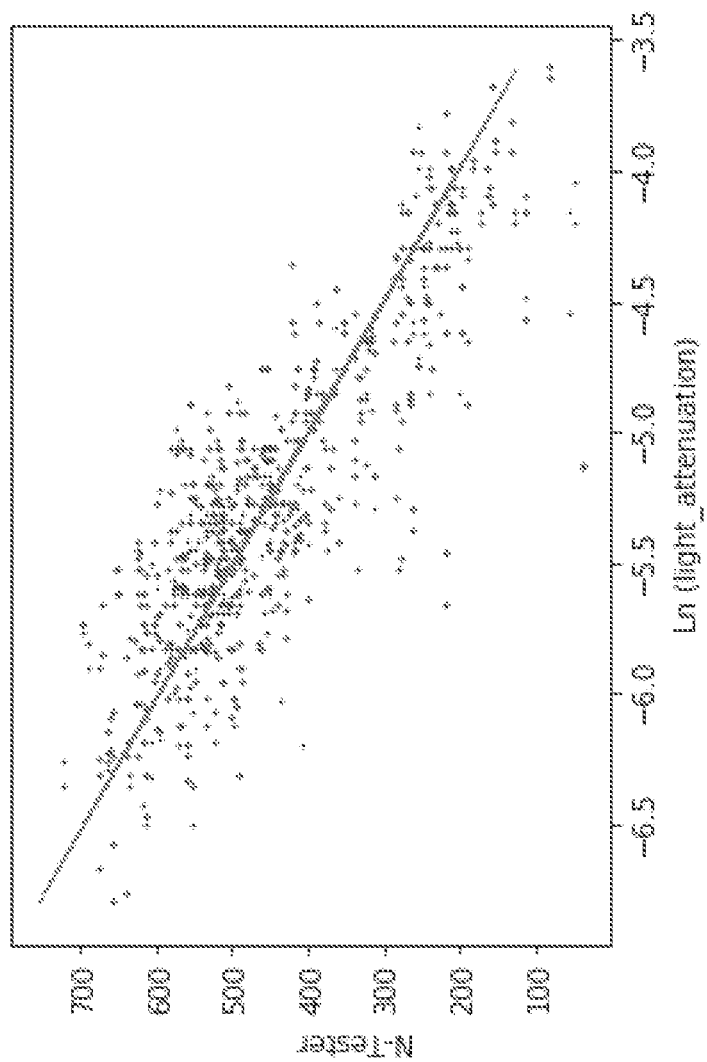
FIG. 4 is a chart illustrating exemplary performance of the present invention.

FIG. 4 is a chart showing the relationship between the natural logarithm of attenuation values (obtained from a trial of the present invention) and N-tester values (computed) obtained from a trial of the present invention.

Figure 5:
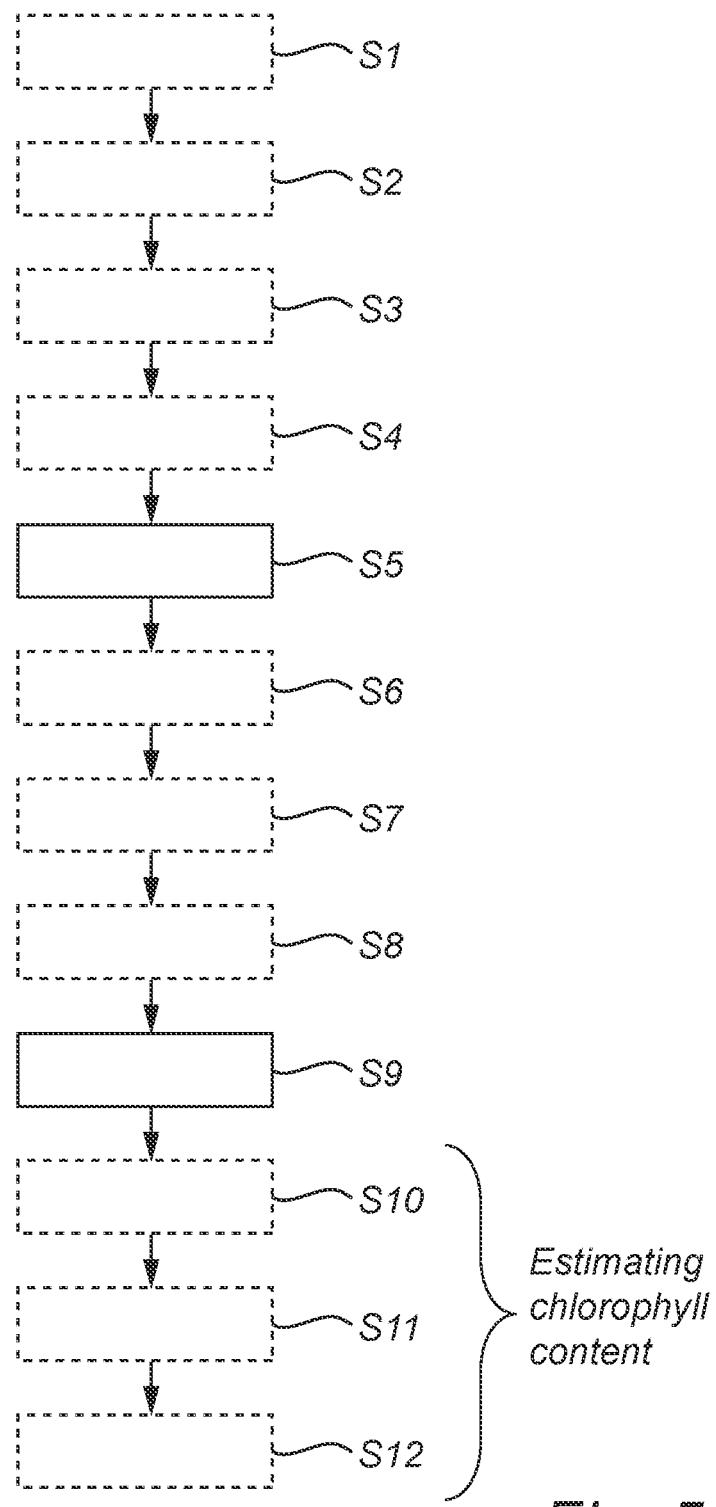
FIG. 5 is a flowchart of a method according to one or more embodiments of the present invention.

FIG. 5 is a flow chart of a method of estimating chlorophyll content of a leaf 12. The method may for example be performed using the device 10. Hence the method may correspond to operation of the device 10.

The method may be initiated by the user attaching the peripheral 18 to the mobile computing device 14, and turns the light source 20 on (step S1).

The mobile computing device 14 may prompt the user to the remove any leaf 12 placed between the digital camera 16 and the light source 20 (step S2).

The mobile computing device 14 may then automatically set the focus point 36 of the digital camera 16 on the turned on light source 20 for capturing the first image 34a (step S3).

The mobile computing device 14 may then automatically capture the first image 34a of the turned on light source 20 without the leaf 12 interposed between the digital camera 16 and the light source 20 (step S4).

In step S5, the method comprises retrieving exposure data of the first image 34a. The retrieved exposure data may be stored in the memory and/or storage of the mobile computing device 14.

The mobile computing device 14 may then prompt the user to place the leaf 12 between the digital camera 16 and the light source 20 (step S6). The user may (at this point) place the leaf 12 in the space 19 between the digital camera 16 and the light source 20.

In step S7, the mobile computing device 14 may set the focus point, exposure time and ISO value of the digital camera 16 to be the same as for the first image 34a.

The mobile computing device 14 may then in step S8 automatically capture the second image 34b with the leaf 12 interposed between the digital camera 14 and the turned on light source 20, using the settings from step S7.

The first and second images 34a-b are preferably captured consecutively. Furthermore, the time between capturing the first and second images 34a-b is preferably less than 1 hour, in particular less than 30 min. Furthermore, the brightness and position of the light source 20 is preferably kept constant for the two images 34a-b.

In step S9, the method comprises retrieving exposure data of the second image 34b. The retrieved exposure data may be stored in the memory and/or storage of the mobile computing device 14.

The mobile computing device 14 may then determine the illuminance values of the first and second images 34a-b based on the exposure data retrieved in steps S5 and S9, and from there determine the attenuation value (step S10).

Furthermore, the user may enter type of crop and days after sowing (or crop stage week) via the aforementioned touchscreen of the mobile computing device 14, whereby the mobile computing device 14 may retrieve the predetermined thickness of the leaf 12 (step S11).

In step S12, the mobile computing device 14 may compute the N-Tester value based on the determined attenuation value in step S10 and the predefined thickness of the leaf from step S11.

From the computed N-Tester value, it can be determined if the plant that the leaf 12 comes from needs further fertilizer. The computed N-Tester value could for example be presented on the touchscreen of the mobile computing device 14. Computed N-Tester values could also be transmitted remotely of the device 10/14, for example together with GPS location data and/or other data available in the mobile computing device 14.

Steps S10-S12 may collectively be referred to as estimating the chlorophyll content of the leaf 12 based (at least partly) on the exposure data of the first and second images 34a-b.

The person skilled in the art realizes that the present invention by no means is limited to the embodiments described above. On the contrary, many modifications and variations are possible within the scope of the appended claims.

For example, instead of setting exposure time and ISO value in step S7, the mobile computing device 14 may set the F-number and ISO value of the digital camera 16 to be the same as for the first image 34a, whereas the exposure time for the second image 34b is selected by the digital camera 16 using the light meter functionality to get correct exposure (digital camera 16 in aperture priority mode). This may be useful in case the digital camera 16 has a fixed aperture. As other alternatives, only the same ISO value (like in the example on page 12) or the same F-number is used.

Furthermore, at least some steps in the method of FIG. 5 do not have to be performed in the exact order shown in FIG. 5. For example, the illuminance value of the first image 34a could be determined directly after step S5. Also, the user could enter type of crop and days after sowing earlier in the method. Furthermore, the second image 34b could be captured before the first image 34a.

Furthermore, capturing by the digital camera the second image with the leaf interposed between the digital camera and the turned on light source and retrieving exposure data of the second image could include capturing at least two images of different portions of the leaf and retrieving the (average) exposure data of those images.

Furthermore, the peripheral 18 could be provided without the mobile computing device 14.

The invention claimed is:

1. A method of estimating chlorophyll content of a leaf, which method comprises:
   providing a device, wherein the device comprises: a mobile computing device comprising a digital camera; and a peripheral removably attached to the mobile computing device, the peripheral comprising a light source aligned with the digital camera when the peripheral is removably attached to the mobile computing device such that the light source may illuminate a lens of the digital camera, wherein the light source is adapted to emit light at least partly absorbable by chlorophyll pigments, chlorophyll a and chlorophyll b, and wherein the peripheral provides for a space between the light source and the digital camera such that the leaf may be interposed between the digital camera and the light source;
   capturing by the digital camera a first image of the light source turned on without the leaf interposed between the digital camera and the light source;
   retrieving exposure data of the first image;
   capturing by the digital camera a second image with the leaf interposed between the digital camera and the turned on light source;
   retrieving exposure data of the second image; and
   using a processor, estimating the chlorophyll content of the leaf based on the retrieved exposure data of the first and second images, wherein the processor estimates the chlorophyll content of the leaf based on at least one of exposure time, F-number, and ISO value of the first and second images.

2. The method according to claim 1, wherein the mobile computing device controls the digital camera such that the first and second images are captured with a same F-number.

3. The method according to claim 1, wherein estimating the chlorophyll content of the leaf based on the retrieved exposure data of the first and second images comprises determining illuminance values of the first and second images based on the retrieved exposure data of the first and second images and determining an attenuation value based on the determined illuminance values.

4. The method according to claim 1, wherein estimating the chlorophyll content of the leaf is further based on a predefined thickness of the leaf, which predefined thickness of the leaf is based on type of crop and days after sowing from a user input to the mobile computing device.

5. The method according to claim 4, comprising computing a proprietary value indicative of the chlorophyll content of the leaf based on a determined attenuation value and the predefined thickness of the leaf.

6. The method according to claim 1, wherein the mobile computing device automatically sets a focus point of the digital camera on the turned on light source for capturing the first image and controls the digital camera so as to use same focus point when capturing the second image.

7. The method according to claim 1, wherein the light source is adapted to emit light of a single predetermined wavelength, for example 650 nm.

8. The method according to claim 1, wherein the light source is an LED, light emitting diode.

9. The method according to claim 1, wherein the light source is provided with a hollow light guide for blocking ambient light when the light source is aligned with the digital camera.

10. The method according to claim 1, wherein the mobile computing device is a smartphone or tablet.

11. The method according to claim 3, comprising computing a proprietary value indicative of the chlorophyll content of the leaf based on the determined attenuation value and a predefined thickness of the leaf.

12. A non-transitory computer-readable storage medium comprising a computer program product, the computer program product comprising computer program code to perform, when executed on a mobile computing device comprising a digital camera, the steps of:

capturing by the digital camera of the mobile computing device a first image of a turned on light source of a peripheral removably attached to the mobile computing device, which first image is captured without a leaf interposed between the digital camera and the light source, wherein the light source is adapted to emit light at least partly absorbable by chlorophyll pigments, chlorophyll a and chlorophyll b;

retrieving exposure data of the first image;

capturing by the digital camera a second image with the leaf interposed between the digital camera and the turned on light source;

retrieving exposure data of the second image; and estimating a chlorophyll content of the leaf based on the retrieved exposure data of the first and second images, wherein a processor of the mobile computing device estimates the chlorophyll content of the leaf based on at least one of an exposure time, F-number, and ISO value of the first and second images.

13. A mobile computing device comprising the non-transitory computer-readable storage medium according to claim 12.

* * * * *